United States Patent
Lee et al.

(10) Patent No.: US 12,209,149 B2
(45) Date of Patent: Jan. 28, 2025

(54) CONTINUOUS PREPARATION SYSTEM OF CONJUGATED DIENE-BASED POLYMER

(71) Applicant: LG Chem, Ltd., Seoul (KR)

(72) Inventors: Tae Chul Lee, Daejeon (KR); Su Hwa Kim, Daejeon (KR); No Ma Kim, Daejeon (KR); Jun Seok Ko, Daejeon (KR)

(73) Assignee: LG Chem, Ltd., Seoul (KR)

(*) Notice: Subject to any disclaimer, the term of this patent is extended or adjusted under 35 U.S.C. 154(b) by 617 days.

(21) Appl. No.: 17/606,822

(22) PCT Filed: Dec. 24, 2020

(86) PCT No.: PCT/KR2020/019114
§ 371 (c)(1),
(2) Date: Oct. 27, 2021

(87) PCT Pub. No.: WO2021/153912
PCT Pub. Date: Aug. 5, 2021

(65) Prior Publication Data
US 2022/0195075 A1    Jun. 23, 2022

(30) Foreign Application Priority Data

Jan. 31, 2020 (KR) .................. 10-2020-0012159

(51) Int. Cl.
*C08F 2/00* (2006.01)
*C08F 2/01* (2006.01)
(Continued)

(52) U.S. Cl.
CPC ............... *C08F 2/001* (2013.01); *C08F 2/01* (2013.01); *C08F 4/545* (2013.01); *C08F 136/06* (2013.01)

(58) Field of Classification Search
CPC ........ C08F 2/001; C08F 4/545; C08F 136/04; B01J 19/1862
(Continued)

(56) References Cited

U.S. PATENT DOCUMENTS 3,801,555 A * 4/1974 Johnson .................. C08F 36/04
                                                    526/87
7,351,776 B2 * 4/2008 Tartamella ............. C08F 6/005
                                                    526/169.1
(Continued)

FOREIGN PATENT DOCUMENTS

EP    3702378 A1    9/2020
JP    H06306106 A   11/1994
(Continued)

OTHER PUBLICATIONS

Extended European Search Report for Application No. 20916361.7 dated May 20, 2022, pp. 1-5.
(Continued)

*Primary Examiner* — Fred M Teskin
(74) *Attorney, Agent, or Firm* — Lerner David LLP

(57) ABSTRACT

A continuous preparation system of a conjugated diene-based polymer having improved rolling resistance properties is provided. By utilizing the continuous preparation system a polymerization conversion ratio at an initial stage of polymerization is easy to control, long time operation is possible and productivity is excellent.

12 Claims, 3 Drawing Sheets

(51) Int. Cl.
*C08F 4/54* (2006.01)
*C08F 136/06* (2006.01)

(58) Field of Classification Search
USPC .......................................................... 526/65
See application file for complete search history.

(56) References Cited

U.S. PATENT DOCUMENTS

| | | | |
|---|---|---|---|
| 9,963,529 | B1 | 5/2018 | Kazemi et al. |
| 2009/0182106 | A1 | 7/2009 | Parola et al. |
| 2019/0169343 | A1 | 6/2019 | Nakatani |
| 2020/0123288 | A1 | 4/2020 | Yoo et al. |
| 2020/0270377 | A1 | 8/2020 | Yamaguchi et al. |
| 2020/0399406 | A1 | 12/2020 | Choi et al. |
| 2021/0380728 | A1 | 12/2021 | Kiener et al. |

FOREIGN PATENT DOCUMENTS

| | | |
|---|---|---|
| JP | 2009512748 A | 3/2009 |
| JP | 2018002965 A | 1/2018 |
| KR | 20070070877 A | 7/2007 |
| KR | 20080064977 A | 7/2008 |
| KR | 20110128894 A | 11/2011 |
| KR | 20180133641 A | 12/2018 |
| KR | 20190140444 A | 12/2019 |
| WO | 2017104758 A1 | 6/2017 |
| WO | 2019083092 A1 | 5/2019 |
| WO | 2019093579 A1 | 5/2019 |
| WO | 2019110915 A1 | 6/2019 |

OTHER PUBLICATIONS

International Search Report for Application No. PCT/KR2020/019114, dated Apr. 2, 2021, 3 pages.

\* cited by examiner

[FIG. 1]
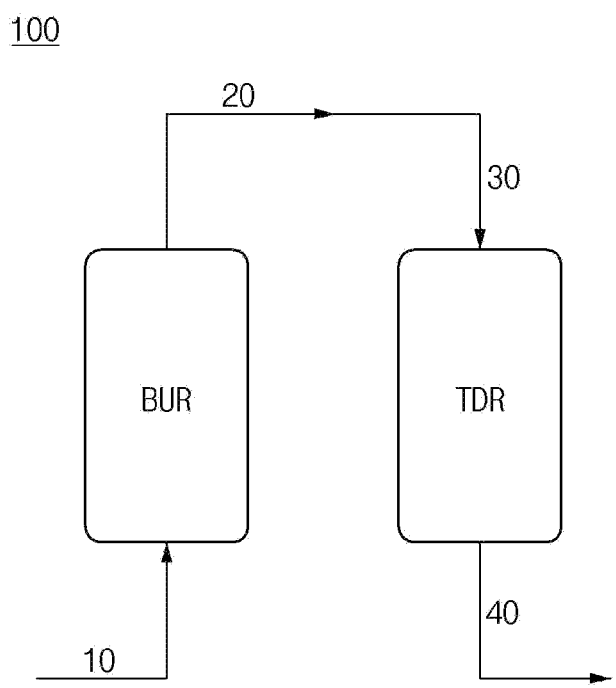

[FIG. 2]
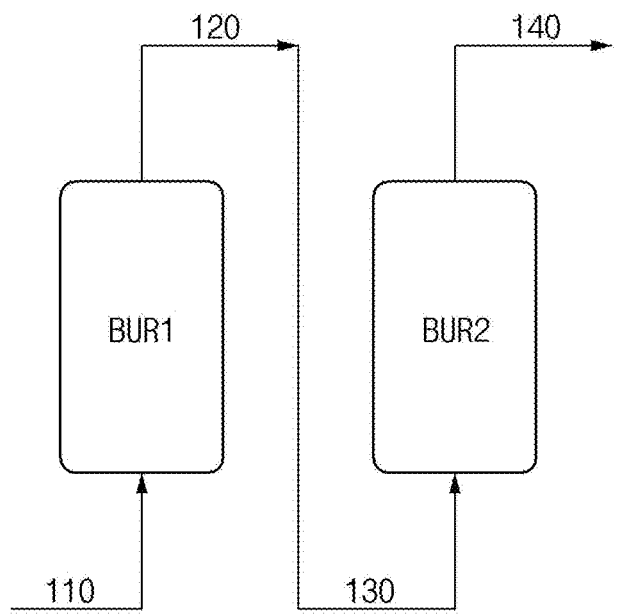
Prior Art

[FIG. 3]
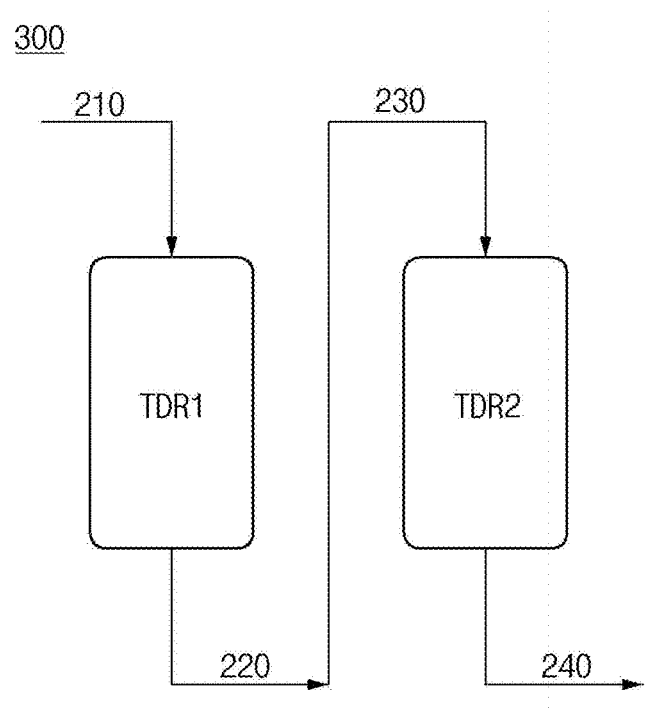
Prior Art

CONTINUOUS PREPARATION SYSTEM OF CONJUGATED DIENE-BASED POLYMER

CROSS-REFERENCE TO RELATED APPLICATIONS

The present application is a national stage entry under 35 U.S.C. § 371 of International Application No. PCT/KR2020/019114 filed on Dec. 24, 2020, which claims priority from Korean Patent Application No. 10-2020-0012159, filed on Jan. 31, 2020, the entire contents of which are incorporated herein by reference.

TECHNICAL FIELD

The present invention relates to a continuous preparation system of a conjugated diene-based polymer having improved rolling resistance properties, by which a polymerization conversion ratio at an initial stage of polymerization is easily controlled, long time operation is possible, and productivity is excellent.

BACKGROUND ART

According to the recent demand for cars having a low fuel consumption ratio, a conjugated diene-based polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan 5, Goodrich heating, or the like is used as an evaluation index of the vulcanized rubber. That is, it is desirable to use a rubber material having high rebound resilience at the above temperature or a low tan 5 value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based polymers or copolymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and a coupling force with a filler such as silica and carbon black may be increased by coupling or modification of the chain terminals.

In addition, the conjugated diene-based polymer is prepared through batch polymerization or continuous polymerization, and for example, in case of the continuous polymerization, is prepared using a polymerization system in which two or more reactors equipped with stirrers are combined, and polymerization is continuously performed. In this case, in the polymerization system in which two or more reactors are combined, the transporting direction of a polymer in all reactors in the polymerization system is generally controlled the same, that is, a polymer is injected into the top and discharged from the bottom of each reactor, or a polymer is injected into the bottom and discharged from the top.

In case of a downflow polymerization system in which a polymer is injected into the top and discharged from the bottom, for the easy operation of a stirrer in a polymerization reactor, an operation for continuously maintaining the minimum liquid level (polymer amount) in the reactor is required, and in order to maintain a polymerization conversion ratio, discharging is performed while maintaining a constant liquid level. In addition, if a polymerization conversion ratio is small, the control of the temperature of the reactor is difficult, and it is difficult to perform polymerization reaction while controlling the polymerization conversion ratio low. Particularly, with a low polymerization conversion ratio, the generation of contamination increases, and long time operation is not easy.

On the contrary, in case of an upflow polymerization system in which a polymer is injected into the bottom and discharged from the top, for the easy continuous process, a polymer is continuously injected so as to fill up the reactor with the polymer. Accordingly, the control of a pressure in the reactor is difficult, the heat of reaction generated may be removed only through a heat exchanger installed on the inner wall side of the reactor or a baffle, and as a result, if it is difficult to remove the heat of reaction, the concentration of a monomer may not be maintained high, the pressure of all polymers injected into the reactor should be maintained high for continuous operation, and accordingly, there are defects of low productivity. Here, the polymer includes all main materials and supplementary materials injected into the polymer reactor and participating in polymerization.

Meanwhile, a conjugated diene-based polymer may control the molecular weight distribution of a product finally obtained, and accordingly, physical properties such as rolling resistance properties may change according to the control of a polymerization conversion ratio at an initial stage of polymerization and conversion ratios between reactors. Accordingly, in order to prepare a conjugated diene-based polymer having desired excellent rolling resistance properties, a preparation system of which operation is easy, in which a polymerization conversion ratio at initial polymerization reaction may be controlled according to purposes, the generation of blockage phenomenon of the reactor is little, and productivity is high, is necessary.

PRIOR ART DOCUMENT (Patent Document 1) KR 10-2011-0128894 A (2011 Nov. 30.)

DISCLOSURE OF THE INVENTION

Technical Problem

The present invention is devised to solve the above-mentioned problems of the conventional technique, and an object is to provide a continuous preparation system of a conjugated diene-based polymer having excellent rolling resistance properties, by which a polymerization conversion ratio at an initial stage of polymerization may be controlled according to purposes, the generation of the blockage phenomenon of a reactor is little, long time operation is possible, and productivity is excellent.

Technical Solution

To solve the above-described tasks, according to an embodiment of the present invention, the present invention provides a continuous preparation system of a conjugated diene-based polymer, including a polymerization reactor including one upflow reactor and at least one downflow reactor, connected in order, for performing polymerization reaction of a conjugated diene-based monomer in the presence of a organometallic compound in a hydrocarbon solvent, wherein the system includes: the upflow reactor including an upflow reaction chamber, a raw material feed line connected with the bottom of the upflow reaction chamber and feeding a raw material, and a first polymer product discharge line connected with the top of the upflow reaction chamber and discharging a first polymer product; and the downflow reactor including a downflow reaction chamber, a first polymer product feed line connected with the top of the downflow reaction chamber and feeding the first polymer product, and a second polymer product discharge line connected with the bottom of the downflow reaction chamber and discharging a second polymer product, the first polymer product feed line is connected with the first polymer product discharge line in the upflow reactor so that the first polymer product is fed from the upflow reactor to the downflow reactor, and the polymerization reaction in the upflow reactor is performed while controlling a polymerization conversion ratio to greater than 30% to 80% or less.

Advantageous Effects

The preparation system according to the present invention includes a polymerization reactor in which one upflow reactor and at least one downflow reactor are connected in order, and polymerization is initiated in the upflow reactor to perform polymerization, and a polymerization conversion ratio may be easily controlled at an initial stage of the polymerization according to the purpose, and after that, the polymerization is continuously performed in the downflow reactor, and the polymerization conversion ratio may be easily raised, and as a result, long time operation is possible, and a conjugated diene-based polymer having excellent rolling resistance properties may be prepared with high productivity.

BRIEF DESCRIPTION OF DRAWINGS

The accompanying drawings in the disclosure are for illustrating particular embodiments of the present invention and provide a further understanding of the inventive concept together with the aforementioned description of the invention, and accordingly, the present invention should not be interpreted to limit the matters described in such drawings.

FIG. 1 schematically illustrates a continuous preparation system including one upflow reactor and at least one downflow reactor according to an embodiment of the present invention.

FIG. 2 schematically illustrates a continuous preparation system of a conjugated diene-based polymer, composed of conventional common upflow reactors.

FIG. 3 schematically illustrates a continuous preparation system of a conjugated diene-based polymer, composed of conventional common downflow reactors.

EXPLANATION ON SYMBOLS

100, 200, 300: Continuous preparation systems
10, 110, 210: Raw material feed lines
20, 120, 220: First polymer product discharge lines
30, 130, 230: First polymer product feed lines
40, 140, 240: Second polymer product discharge lines
BUR: Upflow reaction chamber
BUR1: Upflow reaction chamber 1
BUR2: Upflow reaction chamber 2
TDR: Downflow reaction chamber
TDR1: Downflow reaction chamber 1
TDR2: Downflow reaction chamber 2

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The term "upflow" in the present invention represents a system having a moving path from a bottom to a top, for example, an upflow reaction chamber represents a system in which a polymer may react in the chamber, while moving from the bottom to the top of the chamber.

The term "downflow" in the present invention has the contrary concept to the upflow and represents a system having a moving path from a top to a bottom, for example, a downflow reaction chamber represents a system in which a polymer may react in the chamber, while moving from the top to the bottom of the chamber.

Meanwhile, the polymer covers all materials which undergo polymerization reaction in a corresponding reaction chamber.

The present invention provides a continuous preparation system of a conjugated diene-based polymer, by which a polymerization conversion ratio at an initial stage of polymerization may be easily controlled, and a conjugated diene-based polymer may be prepared in a high conversion ratio.

The continuous preparation system of a conjugated diene-based polymer according to an embodiment of the present invention is characterized in including: a polymerization reactor including one upflow reactor and at least one downflow reactor, connected in order and performing polymerization reaction of a conjugated diene-based monomer in the presence of an organometallic compound in a hydrocarbon solvent, wherein the system includes: the upflow reactor including an upflow reaction chamber, a raw material feed line connected with the bottom of the upflow reaction chamber and feeding a raw material, and a first polymer product discharge line connected with the top of the upflow reaction chamber and discharging a first polymer product; and the downflow reactor including a downflow reaction chamber, a first polymer product feed line connected with the top of the downflow reaction chamber and feeding the first polymer product, and a second polymer product discharge line connected with the bottom of the downflow reaction chamber and discharging a second polymer product, and the first polymer product feed line is connected with the first polymer product discharge line in the upflow reactor so that the first polymer product is fed from the upflow reactor to the downflow reactor.

In addition, in the continuous preparation system of a conjugated diene-based polymer according to the present invention, polymerization reaction in the upflow reactor is characterized in performing while controlling a polymerization conversion ratio to greater than 30% to 80% or less.

Generally, in a conjugated diene-based polymer, the molecular weight distribution of a polymer finally prepared may be controlled according to the control of a polymerization conversion ratio at an initial stage of polymerization, and according to the molecular weight distribution, the rolling resistance properties of a rubber molded article, for example, a tire manufactured using the polymer are influenced.

Meanwhile, a continuous preparation system of a conjugated diene-based polymer, including two or more reactors is composed of only upflow reactors or downflow reactors. A system composed of only downflow reactors require operation of continuously maintaining a minimum liquid level (polymer amount) and a certain level of liquid level in the reactors for effectively performing polymerization, and in case of reducing a polymerization conversion ratio, the control of a temperature in the reactors is difficult, and it is difficult to perform polymerization reaction while controlling the polymerization conversion ratio low, or in line with the degree according to purposes, and in addition, at a low polymerization conversion ratio, the generation of contaminants increase, and there are problems of disadvantageous long time operation. In addition, in a system composed of only upflow reactors, in order to perform an advantageous continuous process, a polymer is required to be injected so as to continuously fill up the reactors with the polymer, and accordingly, the control of a pressure in the reactors is difficult, the heat of reaction generated could be removed only through heat exchange in a jacket or baffle installed at the reactors, and thus, the removal of the heat of reaction is difficult, and the concentration of a monomer is required to keep low, and as a result, there are problems of low productivity. In addition, in the system composed of only upflow reactors, the removal of the heat of reaction is difficult, the control of a polymerization temperature is difficult including the increase of the polymerization temperature during polymerization reaction, branching is excessively produced due to the side reactions of a polymer chain by the raised polymerization temperature, and as a result, problems of degrading the physical properties such as rolling resistance properties of a polymer may arise.

Accordingly, a system for preparing a conjugated diene-based polymer having excellent rolling resistance properties, by which the blockage phenomenon of the reactor may be improved, long time operation may be possible, a polymer may be prepared in a high conversion ratio (yield), a polymerization conversion ratio at an initial stage of polymerization may be easily controlled according to purposes, and molecular weight distribution may be easily controlled, is necessary. Since the continuous preparation system of a conjugated diene-based polymer according to an embodiment of the present invention includes a polymerization reactor including one upflow reactor and at least one downflow reactor, polymerization is performed in the upflow reactor at the initial stage of polymerization, and a polymerization conversion ratio at an initial stage of polymerization may be easily controlled, and then, since polymerization is continuously performed in the downflow reactor, a final conversion ratio may be markedly increased, long time operation is possible, and at the same time, a high conversion ratio may be shown, thereby obtaining a conjugated diene-based polymer having excellent rolling resistance properties with high productivity.

Hereinafter, the continuous preparation system of a conjugated diene-based polymer will be explained in particular.

The continuous preparation system according to an embodiment of the present invention includes a polymerization reactor in which one upflow reactor and at least one downflow reactor are connected in order, and the upflow reactor may include an upflow reaction chamber, a raw material feed line connected with the bottom of the upflow reaction chamber and feeding a raw material, and a first polymer product discharge line connected with the top of the upflow reaction chamber and discharging a first polymer product.

In addition, the downflow reactor may include a downflow reaction chamber, a first polymer product feed line connected with the top of the downflow reaction chamber and feeding the first polymer product, and a second polymer product discharge line connected with the bottom of the downflow reaction chamber and discharging a second polymer product.

The downflow reactor is connected with the top of the upflow reactor, and particularly, the upflow reactor and the downflow reactor are connected by the first polymer product discharge line at the upflow reactor and the first polymer product feed line at the downflow reactor, and more particularly, the first polymer product feed line at the downflow reactor is connected with the first polymer product discharge line at the upflow reactor, and the first polymer product may be fed from the upflow reactor to the downflow reactor.

In addition, the system may include two or more downflow reactors as necessary, and in this case, in the system, one upflow reactor and two or more downflow reactors may be connected in order.

Particularly, the system may include: the upflow reactor; the downflow reactor and a downflow reactor A, and the upflow reactor may include, as described above, an upflow reaction chamber, a raw material feed line connected with the bottom of the upflow reaction chamber and feeding a raw material, and a first polymer product discharge line connected with the top of the upflow reaction chamber and discharging a first polymer product, the downflow reactor may include, as described above, a downflow reaction chamber, a first polymer product feed line connected with the top of the downflow reaction chamber and feeding the first polymer product, and a second polymer product discharge line connected with the bottom of the downflow reaction chamber and discharging a second polymer product, and the downflow reactor A may include a downflow reaction chamber A, a second polymer product feed line connected with the top of the downflow reaction chamber A and feeding the second polymer product, and a third polymer product discharge line connected with the bottom of the downflow reaction chamber A and discharging a third polymer product.

Here, the first polymer product feed line at the downflow reactor may be connected with the first polymer product discharge line at the upflow reactor to feed the first polymer product from the upflow reactor to the downflow reactor, the second polymer product feed line may be connected with the second polymer product discharge line, and thus, two downflow reactors may be connected.

Meanwhile, the polymerization reaction in the upflow reactor may be performed while controlling a polymerization conversion ratio to greater than 30% to 80% or less, particularly, may be performed while controlling the polymerization conversion ratio to 40% to 70% or 50% to 70%. In this case, the blockage phenomenon of the reactor may be improved, and a conjugated diene-based polymer having even better rolling resistance properties may be prepared. If the polymerization conversion ratio in the upflow reactor is controlled to 30% or less, the conversion ratio of the first polymer product subsequently transported to the downflow reactor may be low, and there may be difficulty in finally obtaining a polymer with a high polymerization conversion ratio, and the blockage phenomenon of the reactor may not be improved. If the polymerization conversion ratio in the upflow reactor is controlled to greater than 80%, a polymerization temperature in the upflow reactor may increase, and defects of deteriorating the physical properties of a polymer finally prepared may arise.

In this case, the polymerization conversion ratio may be controlled according to the reaction temperature, the retention time in the reactor, etc., and the polymerization may be performed while suitably controlling reaction conditions in the upflow reactor so as to control the polymerization conversion ratio in the above-described range.

Here, the polymerization conversion ratio may be determined by, for example, measuring the solid concentration in a polymer solution phase including the polymer during polymerization, and in a particular embodiment, in order to secure the polymer solution, a cylinder type container is installed at the outlet of an upflow reactor to fill up a certain amount of the polymer solution in the cylinder type container, and then, the cylinder type container is separated from the reactor, the weight (A) of the cylinder filled with the polymer solution is measured, the polymer solution filled in the cylinder type container is transported to an aluminum container, for example, an aluminum dish, the weight (B) of the cylinder type container from which the polymer solution is removed is measured, the aluminum container containing the polymer solution is dried in an oven of 140° C. for 30 minutes, the weight (C) of a dried polymer is measured, and calculation is performed according to Mathematical Formula 1 below.

[Mathematical Formula 1]

Polymerization conversion ratio (%) =

$$\frac{\text{Weight }(C)}{[(\text{Weight }(A) - (\text{Weight }(B)) \times \text{Total solid content of each reactor (wt \% } TSC)} \times 100$$

In addition, the continuous preparation system according to an embodiment of the present invention is for performing polymerization so that the polymerization reaction performed in the upflow reactor satisfies only the above-described polymerization conversion ratio, and the upflow reactor may not need a separate condenser for controlling the heat of reaction.

However, the temperature of a raw material injected into the upflow reactor is controlled to remove the heat of reaction in the upflow reactor, or a separate jacket may be provided in the reaction chamber, as necessary. In addition, the upflow reactor may be provided with a pressure controlling valve at the bottom of the upflow reaction chamber for controlling a pressure as necessary. By controlling the polymerization conversion ratio in the upflow reactor as described above, the continuous preparation system according to the present invention does not require a separate means for controlling the pressure in the upflow reaction chamber, but in view of more advantageous control of the polymerization conversion ratio and performing more stable polymerization reaction, a pressure controlling apparatus may be provided in the upflow reaction chamber as necessary.

In addition, the downflow reactor may be provided with a condenser at the top of the downflow reaction chamber to remove the heat of reaction generated during polymerization reaction. In addition, to remove the heat of reaction produced during the polymerization reaction, the first polymer product fed to the downflow reaction chamber may be fed after controlling the temperature low.

For example, the heat of reaction in the downflow reaction chamber may be removed by controlling the temperature of the first polymer product, and the heat of reaction not removed thereby may be removed using a condenser provided at the top of the downflow reaction chamber.

Meanwhile, in an embodiment of the present invention, both the upflow reactor and downflow reactor may be continuous stirring tank-type reactors.

In addition, the continuous preparation system may further include a modification reactor which is connected with the polymerization reactor and performs modification or coupling reaction.

Meanwhile, in the present invention, the continuous preparation system of a conjugated diene-based polymer is an apparatus for preparing a conjugated diene-based polymer by performing the polymerization reaction of a conjugated diene-based monomer in the presence of a catalyst composition including a rare earth metal-containing compound, in a hydrocarbon solvent as described above, and here, the conjugated diene-based monomer is not specifically limited but may be, for example, one or more selected from the group consisting of 1,3-butadiene, 2,3-dimethyl-1,3-butadiene, piperylene, 3-butyl-1,3-octadiene, isoprene and 2-phenyl-1,3-butadiene.

In addition, the catalyst composition includes a rare earth metal-containing compound and further includes at least one of an alkylating agent, a halide and a conjugated diene-based monomer. The rare earth metal-containing compound may be a compound of any one or two or more among rare earth metals with an atomic number from 57 to 71, such as lanthanum, neodymium, cerium, gadolinium, and praseodymium. The rare earth metal-containing compound may include rare earth metal-containing carboxylates (e.g., neodymium acetate, neodymium acrylate, neodymium methacrylate, neodymium gluconate, neodymium citrate, neodymium fumarate, neodymium lactate, neodymium maleate, neodymium oxalate, neodymium 2-ethylhexanoate, or neodymium neodecanoate); organophosphates (e.g., neodymium dibutyl phosphate, neodymium dipentyl phosphate, neodymium dihexyl phosphate, neodymium diheptyl phosphate, neodymium dioctyl phosphate, neodymium bis(1-methylheptyl) phosphate, neodymium bis(2-ethylhexyl) phosphate, or neodymium didecyl phosphate); organophosphonates (e.g., neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, or neodymium octadecyl phosphonate); organophosphinates (e.g., neodymium butylphosphinate, neodymium pentylphosphinate, neodymium hexylphosphinate, neodymium heptylphosphinate, neodymium octylphosphinate, neodymium (1-methylheptyl)phosphinate, or neodymium (2-ethylhexyl) phosphinate); carbamates (e.g., neodymium dimethylcarbamate, neodymium diethylcarbamate, neodymium diisopropylcarbamate, neodymium dibutylcarbamate, or neodymium dibenzylcarbamate); dithiocarbamates (e.g., neodymium dimethyldithiocarbamate, neodymium diethyldithiocarbamate, neodymium diisopropyldithiocarbamate, or neodymium dibutyldithiocarbamate); xanthates (e.g., neodymium methylxanthate, neodymium ethylxanthate, neodymium isopropylxanthate, neodymium butylxanthate, or neodymium benzylxanthate); β-diketonates (e.g., neodymium acetylacetonate, neodymium trifluoroacetylacetonate, neodymium hexafluoroacetylacetonate, or neodymium benzoylacetonate); alkoxides or allyloxides (e.g., neodymium methoxide, neodymium ethoxide, neodymium isopropoxide, neodymium phenoxide, or neodymium nonylphenoxide); halides or pseudo-halides (e.g., neodymium fluoride, neodymium chloride, neodymium bromide, neodymium iodide, neodymium cyanide, neodymium cyanate, neodymium thiocyanate, or neodymium azide); oxyhalides (e.g., neodymium oxyfluoride, neodymium oxychloride, or neodymium oxybromide); or rare earth element-containing compounds including one or more rare earth element-carbon bonds (e.g., $Cp_3Ln$, $Cp_2LnR$, $Cp_2LnCl$, $CpLnCl_2$, $CpLn$ (cyclooctatetraene), $(C_5Me_5)_2LnR$, $LnR_3$, $Ln(allyl)_3$, or $Ln(allyl)_2Cl$, where Ln is a rare earth metal element, and R is a hydrocarbyl group), and may include any one or mixtures of two or more thereof.

Particularly, the rare earth metal-containing compound may be one or more selected from the group consisting of $Nd(2\text{-ethylhexanoate})_3$, $Nd(2,2\text{-dimethyl decanoate})_3$, $Nd(2,2\text{-diethyl decanoate})_3$, $Nd(2,2\text{-dipropyl decanoate})_3$, $Nd(2,2\text{-dibutyl decanoate})_3$, $Nd(2,2\text{-dihexyl decanoate})_3$, $Nd(2,2\text{-dioctyl decanoate})_3$, $Nd(2\text{-ethyl-2-propyl decanoate})_3$, $Nd(2\text{-ethyl-2-butyl decanoate})_3$, $Nd(2\text{-ethyl-2-hexyl decanoate})_3$, $Nd(2\text{-propyl-2-butyl decanoate})_3$, $Nd(2\text{-propyl-2-hexyl decanoate})_3$, $Nd(2\text{-propyl-2-isopropyl decanoate})_3$, $Nd(2\text{-butyl-2-hexyl decanoate})_3$, $Nd(2\text{-hexyl-2-octyl decanoate})_3$, $Nd(2,2\text{-diethyl octanoate})_3$, $Nd(2,2\text{-dipropyl octanoate})_3$, $Nd(2,2\text{-dibutyl octanoate})_3$, $Nd(2,2\text{-dihexyl octanoate})_3$, $Nd(2\text{-ethyl-2-propyl octanoate})_3$, $Nd(2\text{-ethyl-2-hexyl octanoate})_3$, $Nd(2,2\text{-diethyl nonanoate})_3$, $Nd(2,2\text{-dipropyl nonanoate})_3$, $Nd(2,2\text{-dibutyl nonanoate})_3$, $Nd(2,2\text{-dihexyl nonanoate})_3$, $Nd(2\text{-ethyl-2-propyl nonanoate})_3$, and $Nd(2\text{-ethyl-2-hexyl nonanoate})_3$.

The alkylating agent may use any alkylating agents commonly used for preparing a butadiene-based polymer without specific limitation, and may be an organometallic compound which is soluble in a polymerization solvent and contains metal-carbon bonds, for example, one or more selected from an organoaluminum compound, an organomagnesium compound and an organolithium compound.

Particularly, the organoaluminum compound may be aluminoxanes such as methylaluminoxane (MAO), modified methylaluminoxane (MAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane or 2,6-dimethylphenyl aluminoxane; alkyl aluminums such as trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, and trioctylaluminum; dihydrocarbylaluminum hydrides such as diethylaluminum hydride, di-n-propylaluminum hydride, diisopropylaluminum hydride, di-n-butylaluminum hydride, diisobutylaluminum hydride (DIBAH), di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride and benzyl-n-octylaluminum hydride; hydrocarbylaluminum dihydrides such as ethylaluminum dihydride, n-propylaluminum dihydride, isopropylaluminum dihydride, n-butylaluminum dihydride, isobutylaluminum dihydride, and n-octylaluminum dihydride, or the like.

The organomagnesium compound may include alkylmagnesium compounds such as diethylmagnesium, di-n-propylmagnesium, diisopropylmagnesium, dibutylmagnesium, dihexylmagnesium, diphenylmagnesium and dibenzylmagnesium, and the organolithium compound may include alkyl lithium compounds such as n-butyllithium.

The halide is not specifically limited, but may be one or more selected from a diatomic halogen, an interhalogen compound, a hydrogen halide, an organic halide, a nonmetal halide, a metal halide, or an organometal halide.

The diatomic halogen may include fluorine, chlorine, bromine, or iodine.

Also, the interhalogen compound may include iodine monochloride, iodine monobromide, iodine trichloride, iodine pentafluoride, iodine monofluoride, iodine trifluoride, etc.

Also, the hydrogen halide may include hydrogen fluoride, hydrogen chloride, hydrogen bromide, or hydrogen iodide.

Also, the organic halide may include t-butyl chloride (t-BuCl), t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane (TMSCl), benzoyl chloride, benzoyl bromide, propionyl chloride, propionyl bromide, methyl chloroformate, methyl bromoformate, iodomethane, diiodomethane, triiodomethane (also referred to as "iodoform"), tetraiodomethane, 1-iodopropane, 2-iodopropane, 1,3-diiodopropane, t-butyl iodide, 2,2-dimethyl-1-iodopropane (also referred to as "neopentyl iodide"), allyl iodide, iodobenzene, benzyl iodide, diphenylmethyl iodide, triphenylmethyl iodide, benzylidene iodide (also referred to as "benzal iodide"), trimethylsilyl iodide, triethylsilyl iodide, triphenylsilyl iodide, dimethyldiiodosilane, diethyldiiodosilane, diphenyldiiodosilane, methyltriiodosilane, ethyltriiodosilane, phenyltriiodosilane, benzoyl iodide, propionyl iodide, methyl iodoformate, or the like.

In addition, the nonmetal halide may include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride ($SiCl_4$), silicon tetrabromide, arsenic trichloride, arsenic tribromide, selenium tetrachloride, selenium tetrabromide, tellurium tetrachloride, tellurium tetrabromide, silicon tetraiodide, arsenic triiodide, tellurium tetraiodide, boron triiodide, phosphor triiodide, phosphor oxyiodide, selenium tetraiodide, or the like.

Also, the metal halide may include tin tetrachloride, tin tetrabromide, aluminum trichloride, aluminum tribromide, antimony trichloride, antimony pentachloride, antimony tribromide, aluminum tribromide, gallium trichloride, gallium tribromide, gallium trifluoride, indium trichloride, indium tribromide, indium trifluoride, titanium tetrachloride, titanium tetrabromide, zinc dichloride, zinc dibromide, zinc difluoride, aluminum triiodide, gallium triiodide, indium triiodide, titanium tetraiodide, zinc diiodide, germanium tetraiodide, tin tetraiodide, tin diiodide, antimony triiodide or magnesium diiodide.

Also, the organometal halide may include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride (EASC), isobutylaluminum sesquichloride, methylmagnesium chloride, methylmagnesium bromide, ethylmagnesium chloride, ethylmagnesium bromide, n-butylmagnesium chloride, n-butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, di-n-butyltin dichloride, di-n-butyltin dibromide, tri-n-butyltin chloride, tri-n-butyltin bromide, methylmagnesium iodide, dimethylaluminum iodide, diethylaluminum iodide, di-n-butylaluminum iodide, diisobutylaluminum iodide, di-n-octylaluminum iodide, methylaluminum diiodide, ethylaluminum diiodide, n-butylaluminum diiodide, isobutylaluminum diiodide, methylaluminum sesquiiodide, ethylaluminum sesquiiodide, isobutylaluminum sesquiiodide, ethylmagnesium iodide, n-butylmagnesium iodide, isobutylmagnesium iodide, phenylmagnesium iodide, benzylmagnesium iodide, trimethyltin iodide, triethyltin iodide, tri-n-butyltin iodide, di-n-butyltin diiodide, di-t-butyltin diiodide, or the like.

In addition, the conjugated diene-based monomer included in the catalyst composition may be the same as described above.

Hereinafter, the continuous preparation system will be explained in particular referring to FIG. 1.

FIG. 1 schematically illustrates a continuous preparation system including one upflow reactor and at least one downflow reactor according to an embodiment of the present invention.

As shown in FIG. 1, a continuous preparation system (100) according to an embodiment of the present invention includes an upflow reactor and a downflow reactor, the upflow reactor is provided with an upflow reaction chamber (BUR), a raw material feed line (10) connected with the bottom of the upflow reaction chamber and feeding a raw material, and a first polymer product discharge line (20) connected with the top of the upflow reaction chamber and discharging a first polymer product, the downflow reactor is provided with a downflow reaction chamber (TDR), a first polymer product feed line (30) connected with the top of the downflow reaction chamber and feeding the first polymer product, and a second polymer product discharge line (40) connected with the bottom of the downflow reaction chamber and discharging a second polymer product, the first polymer product feed line (20) is connected with the first polymer product discharge line (30), and the upflow reactor and the downflow reactor are connected so that the first polymer product is transported from the top of the upflow reactor to the top of the downflow reactor.

Hereinafter, the present invention will be explained in more detail referring to embodiments. However, the embodiments are only for illustrating the present invention, and the scope of the present invention should not be limited thereto.

EXAMPLES

Example 1

A polymer was continuously prepared using a continuous preparation system (100) including one upflow reactor and one downflow reactor, as shown in FIG. 1.

Particularly, prepared was a continuous polymerization reactor including an upflow reactor including an upflow reaction chamber (BUR) provided with a raw material feed line (10) at the bottom and a first polymer product discharge line (20) at the top, and a downflow reactor including a downflow reaction chamber (TDR) provided with a first polymer product feed line (30) at the top and a second polymer product discharge line (40) at the bottom.

As a raw material, 4.7 kg (1,3-butadiene content of 500 g) of a 1,3-butadiene/hexane mixture solution was injected in 4700 g/hr, and a catalyst composition was injected in 200 g/hr through the raw material feed line (10) into the upflow reaction chamber (BUR). In this case, the catalyst composition was prepared by adding neodymium versatate (NdV), adding diisobutylaluminum hydride (DIBAH) and diethylaluminum chloride (DEAC) in order so as to satisfy a molar ratio of neodymium versatate:DIBAH:DEAC=1:9-10:2-3 in a hexane solution under nitrogen conditions, and mixing. Then, polymerization reaction was performed so that a polymerization conversion ratio became 50% in the upflow reaction chamber (BUR), and a first polymer product produced was discharged through the first polymer product discharge line (20) from the upflow reaction chamber and fed through the first polymer product feed line (30) to the downflow reaction chamber (TDR). Then, polymerization reaction was performed at a polymerization temperature of 70° C. for 1 hour to prepare a second polymer product, and a polymerization conversion ratio of the second polymer product prepared was 98%. Then, the second polymer product underwent steam stripping to prepare a 1,3-butadiene polymer.

Example 2

A 1,3-butadiene polymer was prepared by the same method as in Example 1 except for performing the polymerization reaction until the polymerization conversion ratio in the upflow reaction chamber reached 70%, in Example 1.

Example 3

A 1,3-butadiene polymer was prepared by the same method as in Example 1 except for performing the polymerization reaction until the polymerization conversion ratio in the upflow reaction chamber reached 40%, in Example 1.

Example 4

A polymer was continuously prepared using a continuous preparation system including a polymerization reactor in which one upflow reactor and two downflow reactors are connected in order.

Particularly, prepared was a continuous polymerization reactor including an upflow reactor including an upflow reaction chamber provided with a raw material feed line at the bottom and a first polymer product discharge line at the top, a first downflow reactor including a first downflow reaction chamber provided with a first polymer product feed line at the top and a second polymer product discharge line at the bottom, and a second downflow reactor including a second downflow reaction chamber provided with a second polymer product feed line at the top and a third polymer product discharge line at the bottom.

As a raw material, 4.7 kg (1,3-butadiene content of 500 g) of a 1,3-butadiene/hexane mixture solution was injected in 4700 g/hr, and a catalyst composition was injected in 200 g/hr through the raw material feed line into the upflow reaction chamber. In this case, the catalyst composition was prepared by adding neodymium versatate (NdV), adding diisobutylaluminum hydride (DIBAH) and diethylaluminum chloride (DEAC) in order so as to satisfy a molar ratio of neodymium versatate:DIBAH:DEAC=1:9-10:2-3 in a hexane solution under nitrogen conditions, and mixing. Then, polymerization reaction was performed so that a polymerization conversion ratio became 50% in the upflow reaction chamber, and a first polymer product produced was discharged through the first polymer product discharge line from the upflow reaction chamber and fed through the first polymer product feed line to the first downflow reaction chamber. Then, polymerization reaction was performed at a polymerization temperature of 70° C. for 20 minutes to prepare a second polymer product. The second polymer product thus prepared was discharged through the second polymer product discharge line from the first downflow reaction chamber and fed through the second polymer product feed line to the second downflow reaction chamber, and then, polymerization reaction was performed at 70° C. for 20 minutes to prepare a third polymer product. Then, the third polymer product underwent steam stripping to prepare a 1,3-butadiene polymer.

Comparative Example 1

A polymer was continuously prepared using a continuous preparation system (300) including two downflow reactors as shown in FIG. 3.

Particularly, prepared was a continuous polymerization reactor including a first downflow reactor including a downflow reaction chamber 1 (TDR1) provided with a raw material feed line (210) at the top and a first polymer product discharge line (220) at the bottom, and a second downflow reactor including a downflow reaction chamber 2 (TDR2) provided with a first polymer product feed line (230) at the top and a second polymer product discharge line (240) at the bottom.

As a raw material, 4.7 kg (1,3-butadiene content of 500 g) of a 1,3-butadiene/hexane mixture solution was injected in 4700 g/hr, and a catalyst composition was injected in 200 g/hr through the raw material feed line (210) into the downflow reaction chamber 1 (TDR1). In this case, the catalyst composition was prepared by adding neodymium versatate (NdV), adding diisobutylaluminum hydride (DIBAH) and diethylaluminum chloride (DEAC) in order so as to satisfy a molar ratio of neodymium versatate:DIBAH:DEAC=1:9-10:2-3 in a hexane solution under nitrogen conditions, and mixing. Then, a first polymer product produced was discharged through the first polymer product discharge line (220) from the downflow reaction chamber 1 (TDR1) and fed through the first polymer product feed line (230) to the downflow reaction chamber 2 (TDR2). In this case, the polymerization conversion ratio of the first polymer product discharged from the downflow reaction chamber 1 (TDR1) was 70%. Then, polymerization reaction was performed at a polymerization temperature of 70° C. for 1 hour to prepare a second polymer product, and a polymerization conversion ratio of the second polymer product prepared was 98%. Then, the second polymer product underwent steam stripping to prepare a 1,3-butadiene polymer.

Comparative Example 2

A polymer was continuously prepared using a continuous preparation system (200) including two upflow reactors as shown in FIG. 2.

Particularly, prepared was a continuous polymerization reactor including a first upflow reactor including an upflow reaction chamber 1 (BUR1) provided with a raw material feed line (110) at the bottom and a first polymer product discharge line (120) at the top, and a second upflow reactor including an upflow reaction chamber 2 (BUR2) provided with a first polymer product feed line (130) at the bottom and a second polymer product discharge line (140) at the top, and the upflow reaction chamber 1 and the upflow reaction chamber 2 were provided with separate jackets, respectively, for removing the heat of reaction.

As a raw material, 4.7 kg (1,3-butadiene content of 500 g) of a 1,3-butadiene/hexane mixture solution was injected in 4700 g/hr, and a catalyst composition was injected in 200 g/hr through the raw material feed line (110) into the upflow reaction chamber 1 (BUR1). In this case, the catalyst composition was prepared by adding neodymium versatate (NdV), adding diisobutylaluminum hydride (DIBAH) and diethylaluminum chloride (DEAC) in order so as to satisfy a molar ratio of neodymium versatate:DIBAH:DEAC=1:9-10:2-3 in a hexane solution under nitrogen conditions, and mixing. Then, a first polymer product produced was discharged through the first polymer product discharge line (120) from the upflow reaction chamber 1 (BUR1) and fed through the first polymer product feed line (130) to the upflow reaction chamber 2 (BUR2). Then, polymerization reaction was performed for 1 hour until a final polymerization conversion ratio reached 98% to prepare a second polymer product, and the polymerization conversion ratio of the second polymer product thus prepared was 98%. In this case, the polymerization reaction in the reaction chamber 2 was tried to keep 70° C., but the temperature was raised to 80° C. by the heat of reaction though the heat of reaction was removed through a separate jacket, and 70° C. could not be kept. Then, the second polymer product underwent steam stripping to prepare a 1,3-butadiene polymer.

Comparative Example 3

A 1,3-butadiene polymer was prepared by the same method as in Example 1 except for performing the polymerization reaction so that a polymerization conversion ratio in the upflow reaction chamber became 20%, in Example 1.

Comparative Example 4

A 1,3-butadiene polymer was prepared by the same method as in Example 1 except for performing the polymerization reaction so that a polymerization conversion ratio in the upflow reaction chamber became 85%, in Example 1.

Experimental Example 1

In order to confirm the productivity and long time operation probability of the continuous preparation system according to the present invention, the blockage times of the reactors, the polymerization conversion ratios of the first reactors and the conversion ratios of the 1,3-butadiene polymers finally prepared in the Examples and Comparative Examples were measured and shown in Table 1 below. In this case, the blockage time of the reactor represents an elapsed time from the initiation of the reaction to a point where any one or more reactors were completed blocked, and further progress of the reaction was impossible any further.

TABLE 1

| Division | Example | | | | Comparative Example | | | |
|---|---|---|---|---|---|---|---|---|
|  | 1 | 2 | 3 | 4 | 1 | 2 | 3 | 4 |
| First reactor conversion ratio (wt %) | 50 | 70 | 40 | 50 | 70 | 50 | 20 | 85 |
| 1,3-butadiene polymer conversion ratio (wt %) | 98 | 98 | 96 | 98 | 98 | 98 | 90 | 98 |
| Reactor blockage time (hr) | 40 | 60 | 40 | 40 | 15 | 40 | 20 | 50 |

As shown in Table 1, in case of preparing polymers using Example 1 to Example 4, which are continuous preparation systems in which one upflow reactor and at least one downflow reactor are connected in order, the polymerization conversion ratios in the upflow reactor where initial polymerization reaction was performed, were controlled to a specific range, and then polymerization reaction in the downflow reactor was performed continuously. Accordingly, the blockage phenomenon of the reactors was markedly reduced, long time operation was possible, and 1,3-butadiene polymers could be prepared with a high conversion ratio. As confirmed in Table 2 below, markedly improved effects of the rolling resistance properties of the polymers thus prepared were shown.

On the contrary, in case of Comparative Example 1 which corresponds to a continuous preparation system composed of only downflow reactors, the blockage phenomenon of the reactor generated in a short time by four times when compared to Example 2 in which the conversion ratio of the first reactor was controlled equally, and the physical properties of the polymer thus prepared were deteriorated as confirmed in Table 2 below. In addition, in case of Comparative Example 2 which corresponds to a continuous preparation system composed of only upflow reactors, the removal of the heat of reaction in the second reactor was not easy, the control of the polymerization temperature was impossible, and as confirmed in Table 2 below, the physical properties of the polymer thus prepared were deteriorated.

In addition, in case of Comparative Example 3 and Comparative Example 4, which correspond to continuous preparation systems in which one upflow reactor and at least one downflow reactor were connected in order, but the conversion ratio of the first reactor was controlled to deviate from 30% to 80% as suggested in the present invention, the blockage phenomenon of the reactor occurred rapidly in Comparative Example 3, the conversion ratio of the 1,3-butadiene polymer was degraded much, and the physical properties of the 1,3-butadiene polymer prepared were deteriorated in Comparative Example 4 (see Table 2).

Experimental Example 2

Rubber specimens were prepared from the 1,3-butadiene prepared in the Examples and Comparative Examples, rolling resistance properties (fuel consumption ratio properties) were analyzed, and the results are shown in Table 2 below.

(1) Preparation of Rubber Specimen

To 100 parts by weight of each of the 1,3-butadiene polymers prepared above, 70 parts by weight of carbon black, 22.5 parts by weight of a process oil, 2 parts by weight of an antiaging agent (TMDQ), 3 parts by weight of zinc oxide (ZnO) and 2 parts by weight of stearic acid were compounded to prepare each rubber composition. Then, to each rubber composition, 2 parts by weight of sulfur, 2 parts by weight of a vulcanization accelerator (CZ) and 0.5 parts by weight of a vulcanization accelerator (DPG) were added, and gently mixed at 50° C. for 1.5 minutes in 50 rpm. Then, by using a role of 50° C., a vulcanized compound mixture in a sheet shape was obtained. The vulcanized compound mixture was cured at 160° C. for 25 minutes to prepare a rubber specimen.

(2) Rolling Resistance Properties

The rolling resistance properties (fuel consumption ratio properties) were obtained by measuring viscoelasticity behavior on dynamic deformation at each measurement temperature (−60° C.-60° C.) in a film tension mode at a frequency of 10 Hz using a dynamic mechanical analyzer (GABO Co.), and confirming a tan δ value. In the measurement result values, if the tan δ value at 60° C. is reduced, hysteresis loss is small, and rolling resistance properties (fuel consumption ratio properties) are excellent.

TABLE 2

| Division | Example | | | | Comparative Example | | | |
|---|---|---|---|---|---|---|---|---|
|  | 1 | 2 | 3 | 4 | 1 | 2 | 3 | 4 |
| Tan δ (at 60° C.) | 0.162 | 0.165 | 0.160 | 0.160 | 0.175 | 0.175 | 0.166 | 0.173 |
| Index (%) | 108 | 106 | 109 | 109 | 100 | 100 | 105 | 101 |

In Table 2, the index value was calculated from (reference value/measured value)×100 with the measurement value of Comparative Example 1 as the reference value (100).

As shown in Table 2, it was confirmed that in case of the 1,3-butadiene polymers prepared by the continuous preparation systems of Example 1 to Example 4, improved rolling resistance properties were shown when compared with Comparative Examples 1 to 4.

Particularly, the 1,3-butadiene polymers prepared in Example 1 to Example 4 showed markedly improved rolling resistance properties by 6-9% in contrast to the 1,3-butadiene polymers prepared in Comparative Example 1 and Comparative Example 2, and showed improved effects even in contrast to the 1,3-butadiene polymers prepared in Comparative Example 3 and Comparative Example 4.

Through the above-described Table 1 and Table 2, it could be confirmed that in case of a continuous preparation system including a polymerization reactor in which one upflow reactor and at least one downflow reactor are connected in order and performing polymerization reaction in the upflow reactor while controlling a polymerization conversion ratio to a specific ratio according to an embodiment of the present invention, long time operation is possible, and a polymer having excellent rolling resistance properties could be prepared with a high conversion ratio.

The invention claimed is:

1. A system for a continuous preparation of a conjugated diene-based polymer, comprising:
   a polymerization reactor comprising one upflow reactor and at least one downflow reactor, connected in order,
   wherein the upflow reactor comprises an upflow reaction chamber, a raw material feed line connected with a bottom of the upflow reaction chamber, and a first polymer product discharge line connected with a top of the upflow reaction chamber,
   the at least one downflow reactor comprises a downflow reaction chamber, a first polymer product feed line connected with a top of the downflow reaction chamber, and a second polymer product discharge line connected with a bottom of the downflow chamber, and
   the first polymer product discharge line in the upflow reactor is connected with the first polymer product feed line in the at least one downflow reactor,
   wherein the upflow reactor comprises a pressure controlling valve at the bottom of the upflow reaction chamber.

2. The system of claim 1, wherein a polymerization reaction performed in the upflow reactor has a polymerization conversion ratio from 40% to 70%.

3. The system of claim 1, wherein the at least one downflow reactor comprises the downflow reactor and a second downflow reactor,
   the second downflow reactor comprises a second downflow reaction chamber, a second polymer product feed line connected with a top of the second downflow reaction chamber, and a third polymer product discharge line connected with a bottom of the second downflow reaction chamber, and
   the second polymer product feed line is connected with the second polymer product discharge line.

4. The system of claim 1, wherein the at least one downflow reactor comprises a reflux system at the top of the downflow reaction chamber.

5. The system of claim 1, wherein the upflow reactor and the at least one downflow reactor are continuous stirring tank-type reactors.

6. The system of claim 1, further comprising a modification reactor connected with the polymerization reactor, wherein the modification reactor is configured to perform modification or coupling reaction.

7. The system of claim 1, wherein the conjugated diene-based polymer is prepared by using a conjugated diene-based monomer comprising at least one of 1,3-butadiene, 2,3-dimethyl-1,3-butadiene, piperylene, 3-butyl-1,3-octadiene, isoprene or 2-phenyl-1,3-butadiene.

8. The system of claim 1, wherein the conjugated diene-based polymer is prepared by using a catalyst composition comprising at least one rare earth metal-containing compound of $Nd(2\text{-ethylhexanoate})_3$, $Nd(2,2\text{-dimethyl decanoate})_3$, $Nd(2,2\text{-diethyl decanoate})_3$, $Nd(2,2\text{-dipropyl decanoate})_3$, $Nd(2,2\text{-dibutyl decanoate})_3$, $Nd(2,2\text{-dihexyl decanoate})_3$, $Nd(2,2\text{-dioctyl decanoate})_3$, $Nd(2\text{-ethyl-2-propyl decanoate})_3$, $Nd(2\text{-ethyl-2-butyl decanoate})_3$, $Nd(2\text{-ethyl-2-hexyl decanoate})_3$, $Nd(2\text{-propyl-2-butyl decanoate})_3$, $Nd(2\text{-propyl-2-hexyl decanoate})_3$, $Nd(2\text{-propyl-2-isopropyl decanoate})_3$, $Nd(2\text{-butyl-2-hexyl decanoate})_3$, $Nd(2\text{-hexyl-2-octyl decanoate})_3$, $Nd(2,2\text{-diethyl octanoate})_3$, $Nd(2,2\text{-dipropyl octanoate})_3$, $Nd(2,2\text{-dibutyl octanoate})_3$, $Nd(2,2\text{-dihexyl octanoate})_3$, $Nd(2\text{-ethyl-2-propyl octanoate})_3$, $Nd(2\text{-ethyl-2-hexyl octanoate})_3$, $Nd(2,2\text{-diethyl nonanoate})_3$, $Nd(2,2\text{-dipropyl nonanoate})_3$, $Nd(2,2\text{-dibutyl nonanoate})_3$, $Nd(2,2\text{-dihexyl nonanoate})_3$, $Nd(2\text{-ethyl-2-propyl nonanoate})_3$ or $Nd(2\text{-ethyl-2-hexyl nonanoate})_3$.

9. The system of claim 8, wherein the catalyst composition further comprises at least one among an alkylating agent, a halide or a conjugated diene-based monomer.

10. The system of claim 9, wherein the alkylating agent is one or more selected from the group consisting of an organoaluminum compound, an organomagnesium compound and an organolithium compound.

11. The system of claim 9, wherein the halide is one or more selected from the group consisting of a diatomic halogen, an interhalogen compound, a hydrogen halide, an organic halide, a nonmetal halide, a metal halide and an organometallic halide.

12. The system of claim 1, wherein a polymerization reaction performed in the upflow reactor has a polymerization conversion ratio of greater than 30% to 80% or less.

* * * * *